Dec. 16, 1924.

L. MARX

TOY AMUSEMENT DEVICE

Filed March 13, 1923    2 Sheets-Sheet 1

1,519,410

INVENTOR
LOUIS MARX
BY
Meyers, Cavanagh & Whitehead
ATTORNEYS

Dec. 16, 1924. 1,519,410
L. MARX
TOY AMUSEMENT DEVICE
Filed March 13, 1923 2 Sheets-Sheet 2
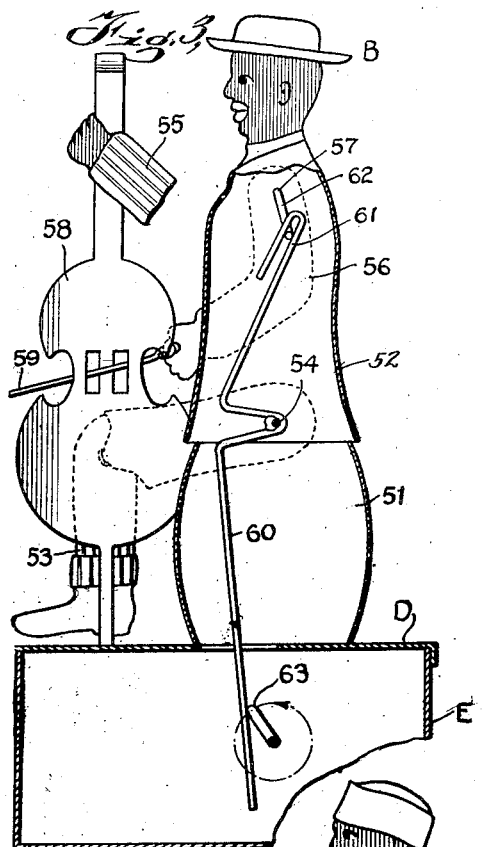
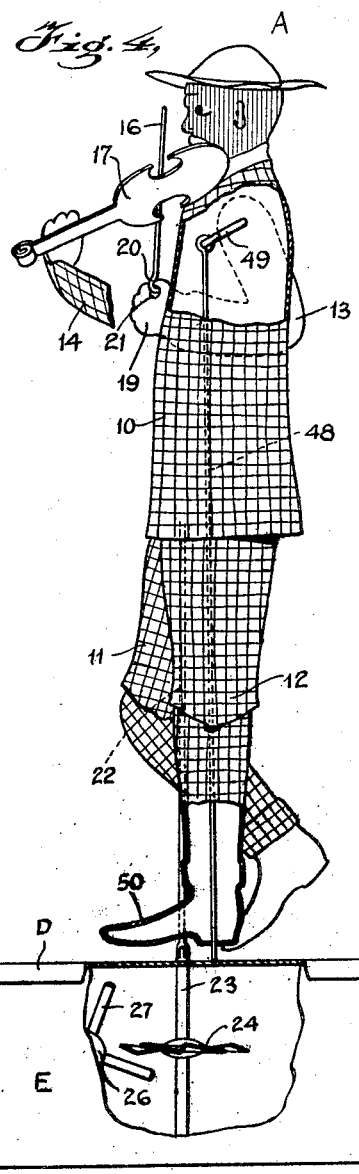
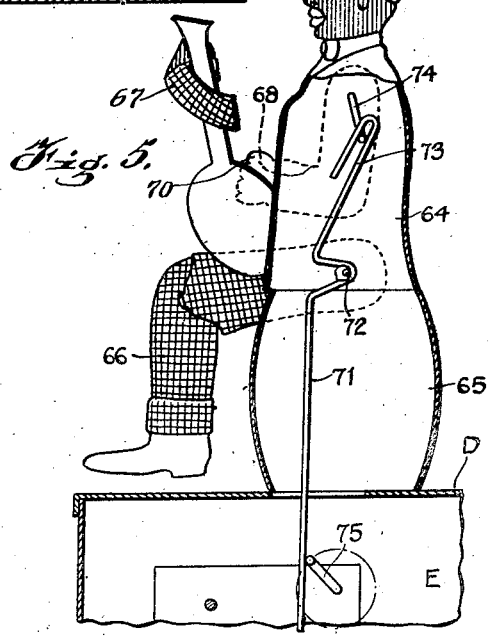
INVENTOR
LOUIS MARX
BY
Meyers, Cavanagh & Whitehead
ATTORNEYS Patented Dec. 16, 1924.

1,519,410

UNITED STATES PATENT OFFICE.

LOUIS MARX, OF NEW YORK, N. Y.

TOY AMUSEMENT DEVICE.

Application filed March 13, 1923. Serial No. 624,696.

*To all whom it may concern:*

Be it known that I, LOUIS MARX, a citizen of the United States, and resident of New York city, in the county of New York and State of New York, have invented certain new and useful Improvements in Toy Amusement Devices, of which the following is a specification.

This invention relates to a top amusement device, and more particularly to an amusement device in which a group of toy figures is co-ordinated and mechanically operated to effect a representation or simulation of a syncopated orchestra in life-like action.

The principal objects of my present invention may be said to include the provision of a toy amusement device presenting a group or ensemble of figures supplied with simulated musical instruments and harmoniously co-ordinated to produce a true and life-like characterization of a syncopated or "jazz" orchestra; the further provision of an orchestral group of this nature in which one member of the group comprises a dancing figure and the other members comprise playing figures, the dancing figure being adapted to be set in motion to render a "dancing" or "jigging" act in harmony with the playing action of the other figures; the still further provision of a syncopated orchestral group in which the dancing figure is operated to play a simulated musical instrument to produce action bearing a striking natural resemblance to an orchestral member of this character; the further provision of a co-ordinated orchestral unit in which the playing figures are constructed and operated to produce bodily movements in time-beating relation or co-operation with the playing motion of the figures; and the still further provision of a figure toy forming part of the group which comprises a novel dancing figure provided with a musical instrument adapted to be set into operation by the dancing action of the figure.

To the accomplishment of the foregoing and such other objects as may hereinafter appear, my invention consists in the elements and their relation one to the other, as hereinafter particularly described and sought to be defined in the claims; reference being had to the accompanying drawing forming a part thereof, wherein:

Fig. 3 is an elevational view taken in cross-section on the line 3—3, Fig. 2 and showing one of the figures in detail on an enlarged scale, Fig. 4 is an elevational view with parts in cross-section showing another figure in detail on an enlarged scale, and Fig. 5 is a detail view of the remaining figure of the group shown in cross-section and taken on the line 5—5, Fig. 2.

Figure 1:
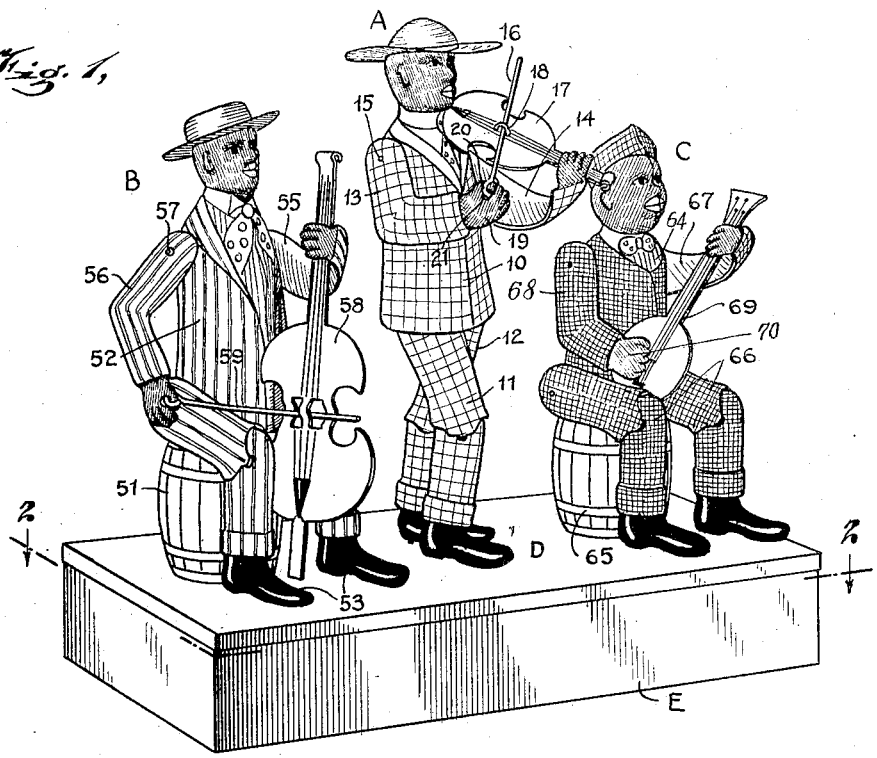
Fig. 1 is a perspective view of the amusement device of my invention.

Referring now more in detail to the drawings, and particularly to Fig. 1 thereof, the orchestral group of my invention comprises generically a group of figures which preferably consists of the three figures generally designated as A, B and C arranged on a stage D which constructionally may comprise a removable cover or closure for the casing E, the said figures being adapted to be set into action by motor mechanism housed by the said casing E for the simulated rendition of a musical and dancing performance.

In the preferred arrangement the member or figure A of the orchestral group is constructed to be set into a dancing and playing act, as will be described more in detail hereinafter, the said figure being preferably arranged centrally on the stage D and between the figures B and C, the latter being preferably positioned in sitting posture as will clearly appear from the drawings, the seated figures B and C being constructed to be set into operation for producing a simulated playing action.

The figure A preferably is made to represent a "darky" character comprising a body 10 provided with the loosely jointed lower limbs 11 and 12 and the relatively movable upper limbs 13 and 14, the limb 14 being stationarily attached to the body and the limb 13 being oscillatably mounted on the body as at 15, the said upper limbs holding a musical instrument, which may for example be a violin, comprising the relatively movable bow and violin parts 16 and 17 held respectively in the movable and stationary upper limbs or arms 13 and 14, the construction being such that when the movable arm 13 is oscillated about the pivot or axis 15, the bow 16 will move on the violin 17 in life-like simulation of the playing of a violin selection. Constructionally the bow 16 may conveniently comprise a rod reciprocally guided on the violin by a yoke piece 18 fixed centrally on the violin, the said rod being loosely connected to the hand member 19 of the arm 13, as by providing a loop 20 in the rod 16 which loosely engages in an aperture 21 in the arm 19.

Figure 2:
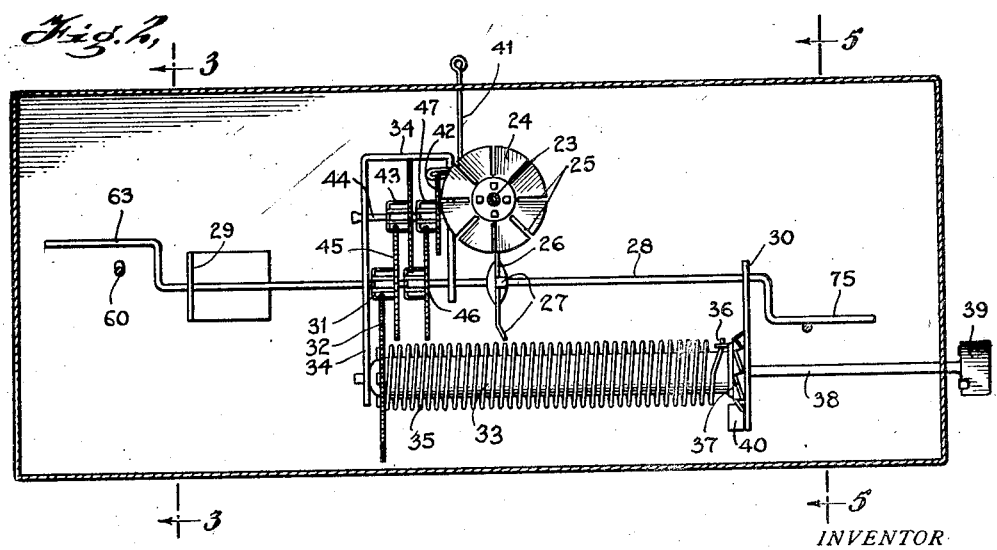
Fig. 2 is a plan view taken in cross-section on the line 2—2, Fig. 1.

The dancing figure A is operatively supported by means of a rod 22 and so movably related to the stage D that when the figure is reciprocated with an ascending and descending motion and rotated about the rod 22, the joints of the lower limbs are broken and the movement of the body synchronized therewith to produce a dancing or "jigging" act. For effecting the desired reciprocating and rotating motion of the figure and its supporting rod, there is provided a slide rod 23 in which the supporting rod 22 is removably inserted, said slide rod 23 being mounted for slidable motion in suitable brackets attached interiorly of the casing E, said slide rod projecting through an aperture in the closure D, the said slide rod carrying a rotor 24 provided with a plurality of vanes or blades defining the radial slots 25. Cooperating with the rotor 24 there is provided an actuating disk 26 including a plurality of radially arranged fingers 27, each of the said fingers being forwardly bent as clearly shown in Fig. 2 of the drawings so that upon rotation of the actuating disk the fingers will successively engage the rotor 24 to impart reciprocating motion to the same and will successively ride in the radial slots 25 to impart rotative motion to the rotor.

For operating the actuating disk 26, the said disk is fixed on a shaft 28 which may be journalled in the spaced brackets 29 and 30 attached to the bottom of the casing E, the said shaft fixedly carrying a pinion 31 meshing with a gear 32 fixed to a motor 33, the said motor comprising a drum journalled in the spaced brackets 34 and 30, to which drum the gear 32 is fixed and on which drum is wound the spring motor 35, one end of the spring motor being attached to the drum 33 and the other end of the same being attached as at 36 to a ratchet 37 freely rotatable on the drum, the said ratchet being fixedly attached to an operating shaft 38 provided with a winding key 39, a stop pawl 40 being provided for cooperating with the ratchet 37 during winding action of the device, the cooperation being such that upon rotation of the winding key 39 the spring motor will be energized or wound for effecting actuation of the rotor 24 to set the figure A into dancing activity.

For controlling the operation of the motor, I provide a stop and starting device which may comprise a bell crank lever 41 pivoted on the bracket 34, the said lever cooperating with the teeth of a braking gear 42, the said gear being driven from the pinion 31 by means of a system of gearing which comprises a gear and pinion unit 43 loosely mounted on a shaft 44 and meshing with a gear 45 attached to the pinion 31 and also meshing with a gear and pinion unit 46, the latter in turn being arranged for meshing engagement with a pinion 47 fixedly attached to the braking gear 42. With this construction it will be apparent that with the motor wound if the lever 41 is moved clockwise as viewed in Fig. 2 for moving the same out of engagement with the braking gear 42, the motor will be free to unwind; and when the lever 41 is returned to the position shown in Fig. 2, the braking of the motor will be effected.

As hereinbefore stated, a desideratum of the present invention comprehends the provision of a dancing figure provided with a musical instrument, which latter may be set into action or operation by the dancing action of the figure. To this end I provide means for relatively moving the parts of the musical instrument carried by the figure A, the said means being operable by the dancing action of the figure. To accomplish this, the movable arm 13 of the figure is adapted to be oscillated by means of a rod 48 (see Fig. 4) which is loosely connected to a crank arm 49 fixedly attached to the arm 13, the said rod 48 extending through the body 10 of the figure and through the members of the lower limb 12, the lower end of the rod projecting from the foot portion 50 as clearly appears from Fig. 4 of the drawings, the construction being such that as the figure A is vertically reciprocated, the lower end of the rod 48 strikes against the stage D and is reciprocated to produce the desired oscillation of the arm 13 and the playing motion of the violin bow 16. While I have shown the figure A supplied with the movable parts of a violin, it will be apparent that other musical instruments may be substituted and the relatively movable parts thereof operated by the dancing action of the figure.

The figure B also preferably comprises a representation of a darky character arranged in sitting posture on a barrel-shaped support 51, the said figure B comprising a body 52 provided with the movable lower limbs 53 pivotally mounted on the body as at 54 (see Fig. 3) and with relatively movable upper limbs or arms consisting of the fixed arm 55 and the movable arm 56, the latter being oscillatably mounted on the body about a pivot 57. The figure B is supplied with a musical instrument which may comprise a violin cello having the body 58 fixedly positioned and held by the fixed arm 55 and the bow 59 guidedly movable over the violin body 58 and loosely held by the arm 56 in a manner as heretofore detailed in connection with figure A, the construction being such that as the arm 56 is oscillated about the pivot 57, the bow 59 is moved in natural simulation with respect to the violin body 58.

For effecting the oscillation of the arm 56, there is provided an operating lever 60 fulcrumed on the pivot 54 and fixedly attached to the same, the upper arm of the lever terminating preferably in a hook-shaped portion 61 which engages a crank arm 62 to which is attached the movable arm 56, the lower end of the said lever extending through the closure D and into the casing E, the said lower arm being adapted to be engaged by a crank arm 63 forming part of the shaft 28, the construction being such that as the shaft is rotated the crank arm rotates in a direction indicated by the arrow in Fig. 3 to effect the oscillation of the lever 60 about the pivot 54, this producing the oscillating movement of the arm 56 and the reciprocating movement of the violin bow 59.

In the preferred construction the movable lower limbs 53 of the figure B are set into action during the operation of the device to produce a time-beating movement in consonance with the performance rendered by the group. This is accomplished by the attachment of the lever 60 to the shaft or pivot 54, and with this construction it will be seen that as the lever 60 is oscillated, the limbs 53 will be elevated and lowered to produce the time-beating effect.

The figure C is constructed and operated in a manner similar to the figure B, and may also comprise a representation of a darky character provided with the body 64 arranged in sitting position on a barrel-shaped support 65, the said body being provided with the movable lower limbs 66 and the relatively movable upper limbs comprising a stationary arm 67 and the movable arm 68, the said stationary arm holding a banjo or similar instrument 69 over which the hand 70 of the arm 68 is adapted to move in characterization of the ordinary manner of playing this instrument. For operating the arm 68 and for moving the limbs 66 also in time-beating relation, I provide means similar to that heretofore described, which preferably comprises an operating lever 71 fulcrumed at and attached to a shaft 72 to which the lower limbs 66 are fixed, the upper arm of the lever being provided with a hook-shaped portion 73 which engages a crank arm 74 to which the movable arm 68 is attached, and the lower arm of the said lever extending through the closure D and into the casing E to be engaged by a crank arm 75 which may also be formed integrally with the shaft 28, the said crank arm being preferably arranged in a position 180° with respect to the crank arm 63 and being arranged for rotation in the direction of the arrow shown in Fig. 5 to successively engage and disengage the rod 71 to impart to the same the desired oscillating motion.

The manner of making and operating my musical device will in the main be fully apparent from the above detailed description thereof. It will be further apparent that I have provided an orchestral unit in which a number of movements is produced to effect a natural characterization of a syncopated or "jazz" orchestra, all the movements being effectuated in a simple and harmonious way by mechanism which may be produced at a comparatively low cost. It will be further apparent that numerous changes and modifications may be made in the construction of the figures and the arrangement of the same without departing from the spirit of the invention defined in the following claims.

I claim:

1. A toy amusement device comprising a group of figures representing a syncopated orchestra, one of said group comprising a bodily movable dancing figure having relatively movable arms holding relatively movable parts of a representation of a musical instrument, the other figures of the group each having relatively movable arms and being each supplied with a representation of a musical instrument, and means for operating the group to set the dancing figure in motion and to set the relatively movable arms of all the figures into action for simulating the playing of the musical instruments.

2. A toy amusement device comprising a group of figures representing a syncopated orchestra, one of said group comprising a bodily movable central figure constructed to be set into a jigging motion and having relatively movable arms provided with relatively movable parts of a representation of a musical instrument, the remainder of the group comprising figures arranged on both sides of the central figure and each having relatively movable arms supplied with a representation of a musical instrument, and means for operating the group to set the jigging figure in motion and to set the relatively movable arms of all the figures into action for simulating the playing of the musical instruments.

3. A toy amusement device comprising a group of figures representing a syncopated orchestra, one of said group comprising a bodily movable dancing figure having relatively movable arms holding relatively movable parts of a simulated musical instrument, another figure of the group being provided with relatively movable parts of a representation of a musical instrument, and means for operating the group to set the dancing figure in motion and to set the relatively movable parts of all the figures into action for simulating the playing of the musical instruments.

4. A toy amusement device comprising a group of figures representing a syncopated orchestra, one of said group comprising a bodily movable dancing figure having relatively movable arms holding relatively movable parts of a simulated musical instrument, another figure of the group being also provided with relatively movable arms holding relatively movable parts of a simulated musical instrument, and means for operating the group to set the dancing figure in motion and to set the arms of all the figures into action for relatively moving the parts of the instruments in simulation of the natural playing thereof.

5. A toy amusement device comprising a group of figures with musical instruments representing a syncopated orchestra, one of said group comprising a dancing figure having relatively movable arms holding relatively movable parts of a representation of a violin, the remainder of the group comprising seated figures, one supplied with relatively movable arms holding relatively movable parts of a representation of a violin cello and the other with relatively movable arms holding a banjo, and means for operating the group to set the dancing figure in motion and to set the arms of all the figures into action for simulating the playing of the musical instruments.

6. A toy amusement device comprising a group of figures representing a syncopated orchestra, the group including a central dancing figure holding a simulated musical instrument and playing figures on each side thereof, means for operating the said musical instrument actuated by the dancing action of the dancing figure at least one of the playing figures being provided with lower limbs movable to produce a beating of time in cooperation with the dancing figure and each being supplied with a simulated musical instrument and with means for operating the same to effect a simulated playing thereof, and means for operating the group to set the dancing figure in motion and to set the remaining figures into action for moving the said lower limbs and for simulating a playing of the musical instruments.

7. A toy amusement device comprising a stage, a group of figures thereon representing a syncopated orchestra, the group including a central jigging figure holding a simulated musical instrument, and playing figures on each side thereof, means for operating the said musical instrument actuated by the jigging of the figure on the stage each of the playing figures being provided with lower limbs movable to produce a beating of time in cooperation with the jigging figure and being each supplied with a simulated musical instrument and with means for operating the same to effect a simulated playing thereof, and means for operating the group to set the jigging figure in motion and to set the remaining figures into action for moving the lower limbs and for simulating a playing of the musical instruments.

8. A toy amusement device comprising a group of figures representing a syncopated orchestra, the group including a dancing figure holding a simulated musical instrument and having means operated by the dancing action of the figure for operating the musical instrument, and a seated playing figure, the playing figure being provided with at least one lower limb movable to produce a beating of time in cooperation with the dancing figure and being supplied with a representation of a musical instrument and with means for operating the same to effect a simulated playing thereof, and means for operating the group to set the dancing figure in motion and to set the remaining figure into action for moving the lower limb and for simulating a playing of the musical instrument.

9. A toy amusement device comprising a casing providing a stage, a group of figures thereon, the group including a central dancing figure holding a simulated musical instrument and having means operated by the dancing action of the figure for operating the musical instrument and playing figures on each side thereof, each of the playing figures being provided with lower limbs movable in time beating cooperation with the dancing figure and each being supplied with a representation of a musical instrument and with means for operating the same to effect a simulated playing thereof, at least one of the musical instruments including relatively movable parts, and means for operating the group to set the central figure in dancing and playing motion and to set the remaining figures into action for moving the lower limbs and for simulating a playing of the musical instruments, the said means including a motor mechanism housed by the casing.

10. A toy amusement device comprising a bodily movable dancing figure provided with a simulated musical instrument and with means actuated by the dancing action of the figure for operating the musical instrument, and means for setting the said figure into dancing motion.

11. A toy amusement device comprising a bodily movable dancing figure having loosely jointed lower limbs, the said figure holding a simulated musical instrument, means operated by the dancing action of the figure for operating the musical instrument, and means for setting the said figure into dancing motion.

12. A toy amusement device comprising a dancing figure holding a simulated musical instrument, the said musical instrument comprising relatively movable parts, means for setting the figure into dancing action, and means for relatively moving the parts of the instrument directly operated by the dancing motion of the figure.

13. A toy amusement device comprising a bodily movable dancing figure holding a simulated musical instrument, the said musical instrument comprising relatively movable parts, means for setting the figure into dancing action, and means for relatively moving the parts of the instrument operated by the dancing motion of the figure.

14. A toy amusement device comprising a figure provided with loosely jointed lower limbs and with relatively movable upper limbs, the said figure being supported for a dancing motion, a simulated musical instrument comprising relatively movable parts held by the relatively movable upper limbs, means for setting the said figure into dancing action, and mechanism for relatively moving the parts of the musical instrument, the said mechanism being operated by the dancing action of the figure on a support.

15. A toy amusement device comprising a dancing figure having loosely jointed lower limbs and relatively movable upper limbs, a simulated musical instrument including relatively movable parts held in the upper limbs, and means for relatively moving the said parts comprising an operating rod connected to the movable upper limb and projecting through one of the lower limbs so that when the figure is bodily moved on a support to effect a dancing action thereof the rod will be operated by contact with the support to operate the musical instrument.

Signed at New York city, in the county of New York and State of New York, this 1st day of March A. D. 1923.

LOUIS MARX.